(12) United States Patent
Iizuka et al.

(10) Patent No.: US 9,348,541 B2
(45) Date of Patent: May 24, 2016

(54) IMAGE PROCESSING APPARATUS AND METHOD, AND NON-TRANSITORY COMPUTER READABLE MEDIUM

(71) Applicant: FUJI XEROX CO., LTD., Tokyo (JP)

(72) Inventors: Miyuki Iizuka, Kanagawa (JP); Taro Mori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/640,677

(22) Filed: Mar. 6, 2015

(65) Prior Publication Data

US 2016/0054954 A1  Feb. 25, 2016

(30) Foreign Application Priority Data

Aug. 20, 2014  (JP) ................ 2014-167567

(51) Int. Cl.
*G06F 17/30* (2006.01)
*G06F 3/12* (2006.01)
*G06T 11/60* (2006.01)

(52) U.S. Cl.
CPC ............ *G06F 3/1204* (2013.01); *G06F 3/1256* (2013.01); *G06T 11/60* (2013.01)

(58) Field of Classification Search
USPC .......... 358/1.15, 1.1; 707/953, 961, 738, 722, 707/729, 730
See application file for complete search history.

(56) References Cited

U.S. PATENT DOCUMENTS

| | | | | |
|---|---|---|---|---|
| 7,506,255 B1 * | 3/2009 | Feinberg | ................. | G06F 3/018 715/246 |
| 9,031,493 B2 * | 5/2015 | Morton | ................. | G09B 5/062 434/308 |
| 9,135,720 B2 * | 9/2015 | Huang | ..................... | G06T 7/602 |
| 2007/0150259 A1 * | 6/2007 | Akahane | ............. | G06F 17/2836 704/2 |
| 2008/0285870 A1 * | 11/2008 | Ando | ..................... | H04N 19/63 382/240 |
| 2010/0155464 A1 * | 6/2010 | Swayn | ..................... | G06K 7/14 235/375 |
| 2011/0083187 A1 * | 4/2011 | Malanov | ............... | G06F 21/562 726/24 |
| 2012/0176220 A1 * | 7/2012 | Garcia | ..................... | G06F 21/32 340/5.83 |
| 2014/0207777 A1 * | 7/2014 | Palmert | ............ | G06F 17/30979 707/737 |
| 2014/0236951 A1 * | 8/2014 | Taycher | ............ | G06F 17/30011 707/738 |
| 2015/0193392 A1 * | 7/2015 | Greenblatt | ........ | G06F 17/30876 715/205 |
| 2015/0193492 A1 * | 7/2015 | Gunaratne | .......... | G06F 21/6218 707/609 |

FOREIGN PATENT DOCUMENTS

| JP | H07168941 A | 7/1995 |
|---|---|---|
| JP | H07282256 A | 10/1995 |

* cited by examiner

*Primary Examiner* — Jerome Grant, II
(74) *Attorney, Agent, or Firm* — Oliff PLC

(57) ABSTRACT

An image processing apparatus includes an identifier that calculates, between multiple items of first document data and multiple items of second document data, a first degree of similarity of a pair of each page of the first document data and each page of the second document data, based on a page order of the first and second document data, extracting a pair of pages of which a second degree of similarity is calculated based on the first degree of similarity, calculating the second degree of similarity of the extracted pair of pages based on images of the first and second document data, and identifies a page of the second document data that corresponds to a page of the first document data, based on the second degree of similarity.

10 Claims, 18 Drawing Sheets

FIG. 9

$$\text{PAIR ESTABLISHMENT PROBABILITY} = \frac{1}{(n+1) \cdot n^{\underline{a}} \cdot m^{\underline{b}}} \sum_{k=0}^{n} \{k^2 \cdot (n-k)^{\underline{a-1}} \cdot (m-k)^{\underline{b-1}}\} \cdots (1)$$

PROVIDED THAT $x^{\underline{y}}$ DENOTES "FALLING FACTORIAL". THAT IS, $$x^{\underline{y}} = \prod_{k=0}^{n-1}(x-k)$$

FIG. 10

| PAGE NUMBER OF OLD DRAWINGS – PAGE NUMBER OF NEW DRAWINGS | PAIR ESTABLISHMENT PROBABILITY |
|---|---|
| 1 – 1 | 17.50% |
| 1 – 2 | 11.18% |
| 1 – 3 | 7.13% |
| 1 – 4 | 4.56% |
| 2 – 1 | 4.17% |
| 2 – 2 | 3.08% |
| 1 – 5 | 2.95% |
| 2 – 3 | 2.28% |
| 1 – 6 | 1.93% |
| 2 – 4 | 1.69% |

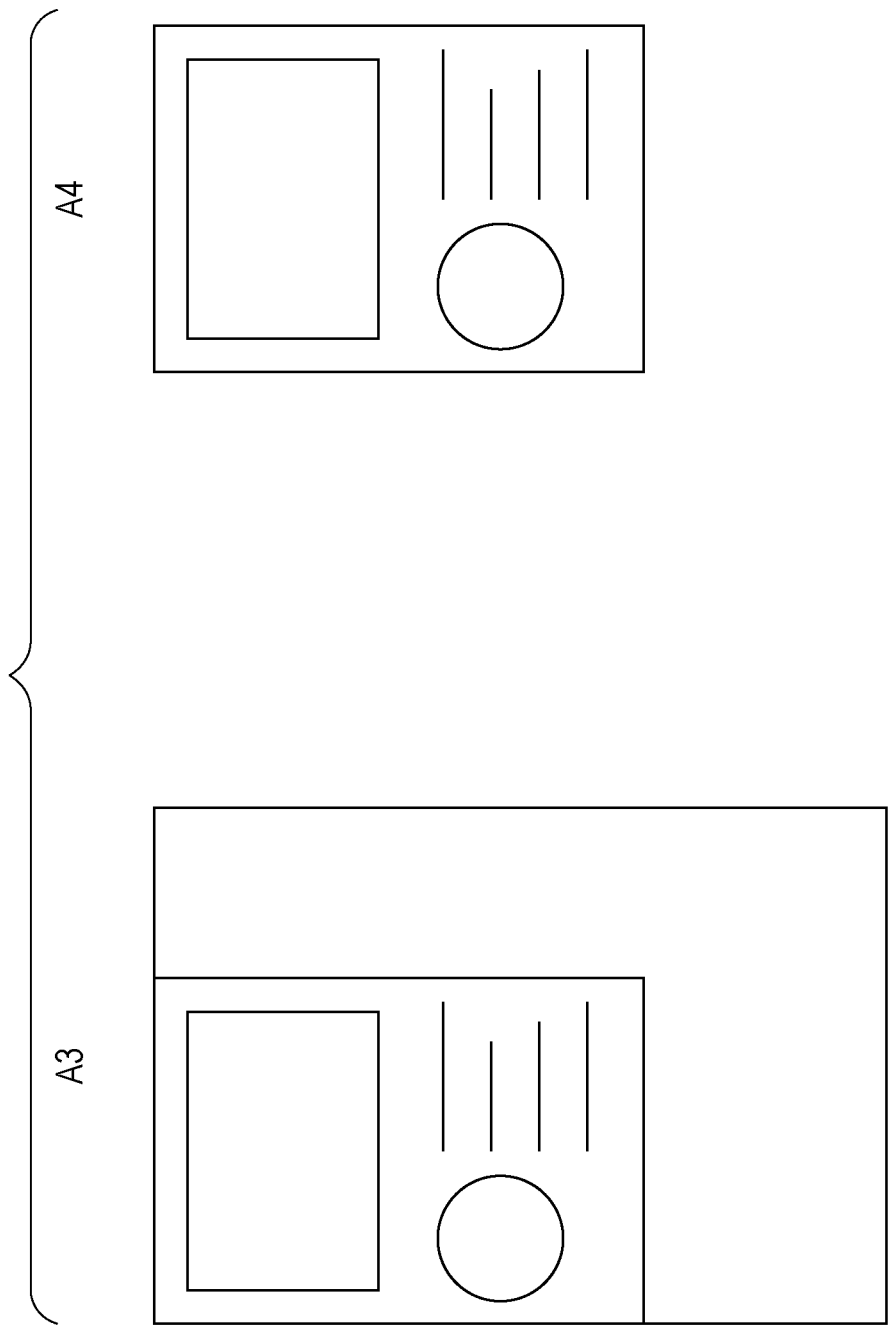

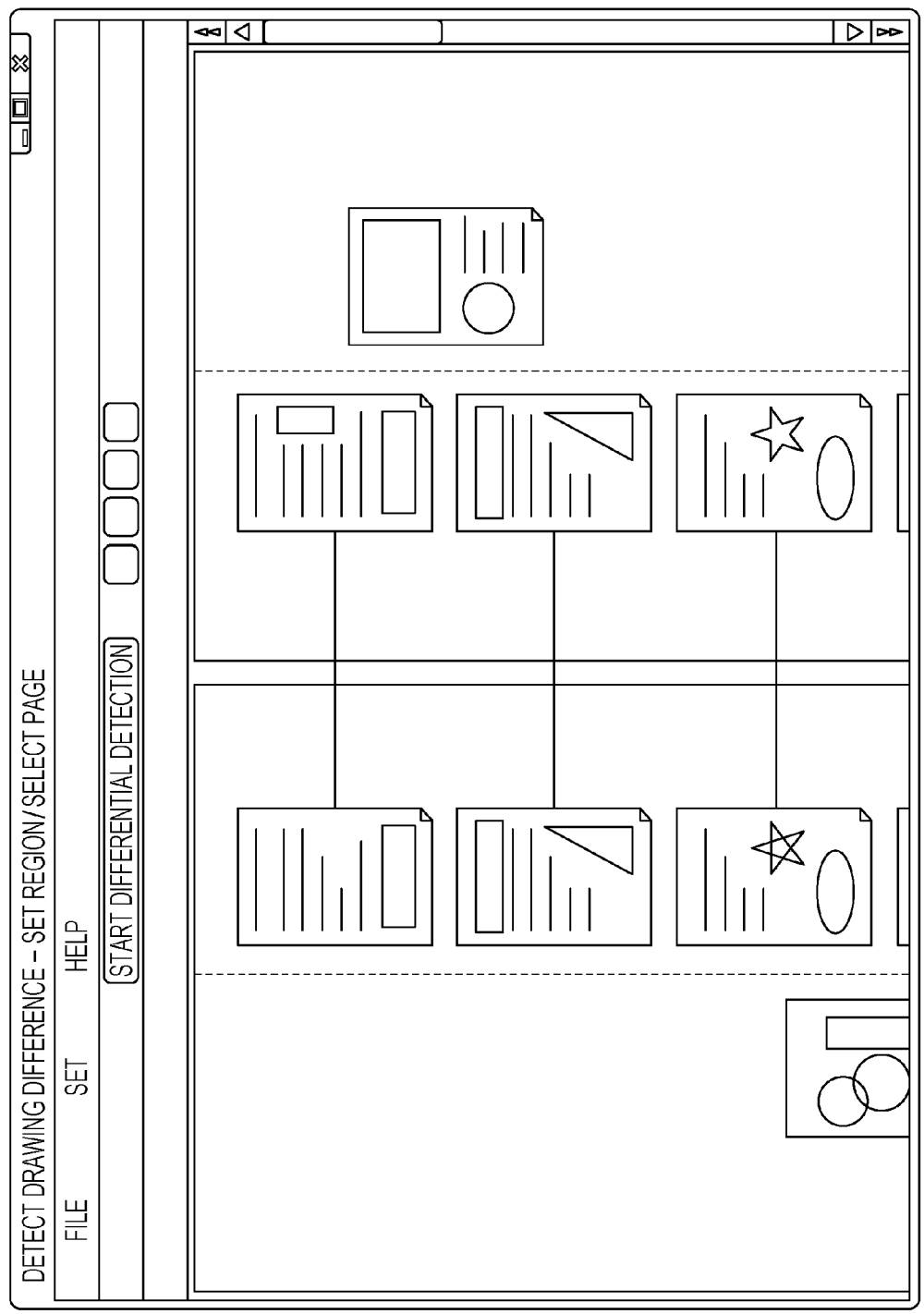

IMAGE PROCESSING APPARATUS AND METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-167567 filed Aug. 20, 2014.

BACKGROUND (i) Technical Field

The present invention relates to an image processing apparatus and method, and a non-transitory computer readable medium.

(ii) Related Art

In the related art, performing checking by calculating the degree of similarity between items of unit data has been known.

By the way, identification of a pair of corresponding items of data by calculating the degree of similarity between multiple items of data involves calculation of the degree of similarity of all pairs of items of data, which is burdensome.

SUMMARY

According to an aspect of the invention, there is provided an image processing apparatus including an identifier that: (i) calculates, between multiple items of first document data and multiple items of second document data, a first degree of similarity of a pair of each page of the first document data and each page of the second document data, based on a page order of the first and second document data, (ii) extracts a pair of pages of which a second degree of similarity is calculated based on the first degree of similarity, and calculates the second degree of similarity of the extracted pair of pages based on images of the first and second document data, and (iii) identifies a page of the second document data that corresponds to a page of the first document data, based on the second degree of similarity.

BRIEF DESCRIPTION OF THE DRAWINGS

An exemplary embodiment of the present invention will be described in detail based on the following figures, wherein:

FIG. 9 is a diagram illustrating an exemplary equation for calculating a pair establishment probability;

FIG. 10 is a diagram illustrating an exemplary calculation result in the case where pair establishment probabilities are calculated on the basis of the equation illustrated in FIG. 9;

FIG. 11 is a diagram for describing an example in which images of the same size are printed on sheets of different sizes;

FIG. 18 is a diagram illustrating an exemplary display in the case where pages where differential detection is to be performed and pages where no differential detection is to be performed are arranged in two columns.

DETAILED DESCRIPTION

Hereinafter, an exemplary embodiment of the present invention will be described with reference to the drawings. Note that the embodiment discussed below serves to illustrate an image processing apparatus and method, and a non-transitory computer readable medium for embodying the technical idea of the exemplary embodiment of the present invention, and the following examples are not intended to be specific to the exemplary embodiment of the present invention. The exemplary embodiment of the present invention may be equally applied to other embodiments included in the claims.

Figure 1:
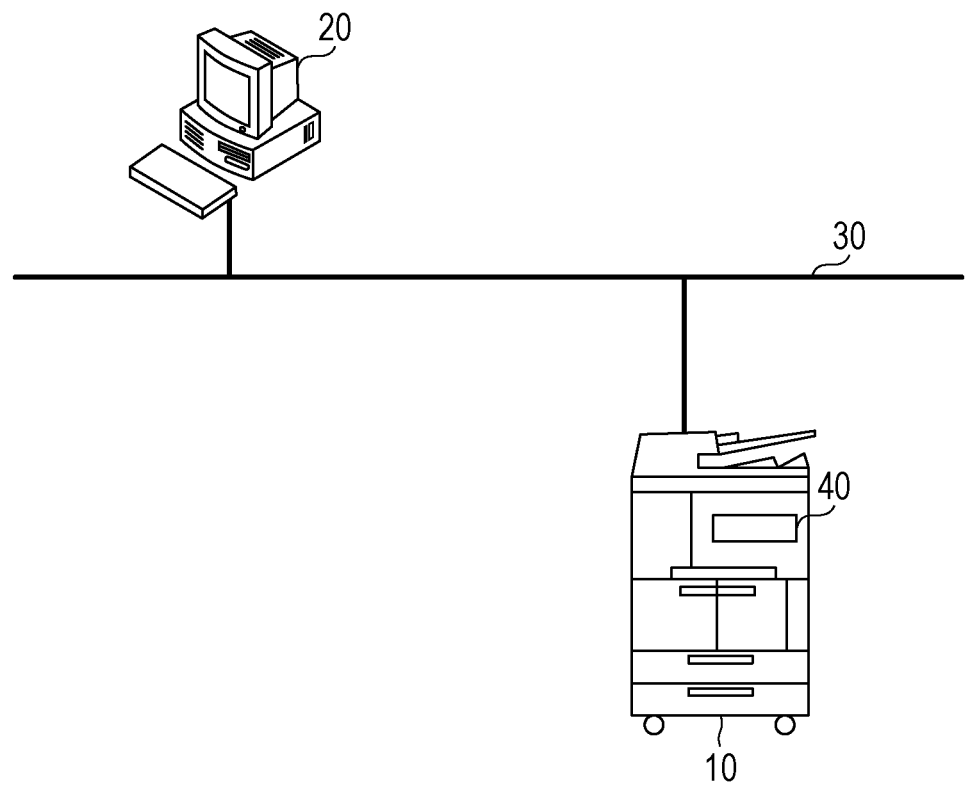
FIG. 1 is a diagram illustrating the system configuration of an image forming system according to an exemplary embodiment of the present invention.

FIG. 1 is a block diagram illustrating the configuration of an image forming system according to an exemplary embodiment of the present invention.

An image forming system using an image processing program according to the exemplary embodiment of the present invention includes an image forming apparatus 10 and a terminal apparatus 20, which are connected to each other through a network 30, as illustrated in FIG. 1. The terminal apparatus 20 generates print data and transmits the generated print data to the image forming apparatus 10 via the network 30. The image forming apparatus 10 accepts the print data transmitted from the terminal apparatus 20, and outputs an image in accordance with the print data on a sheet. Note that the image forming apparatus 10 is an apparatus that is a so-called multifunctional apparatus having multiple functions, such as a print function, a scan function, a copy function, and a facsimile function.

The image forming apparatus 10 is configured to be capable of additionally having, as an optional function, a differential image generating device 40. The differential image generating device 40 has a function of receiving two items of image data subjected to comparison, such as old drawing data and new drawing data, detecting the difference between the old drawing data and the new drawing data, and outputting the detected difference by, for example, displaying the difference as one item of image data. For example, the differential image generating device 40 displays a portion that existed in the old drawing but was deleted in the new drawing in red, and a portion that did not exist in the old drawing but was added in the new drawing in blue. In doing so, the differential image generating device 40 displays, within one item of image data, the difference between the old drawing image and the new drawing image. In displaying this difference, a region where the difference is detected is surrounded by a rectangular frame, which presents to the user a portion where the difference is detected.

Note that the differential image generating device 40 first converts two items of drawing data for comparison to binary image data, sequentially compares corresponding pixels, and thereby detects the difference between the two items of drawing data.

In the case where two drawings for comparison are paper, the scanner of the image forming apparatus 10 first scans images, converts the images to image data, and inputs the image data to the differential image generating device 40, which in turn performs differential detection.

The image forming apparatus 10 outputs an image generated on the basis of differential image data generated by the differential image generating device 40, by printing the image on a print sheet or the like.

Figure 2:
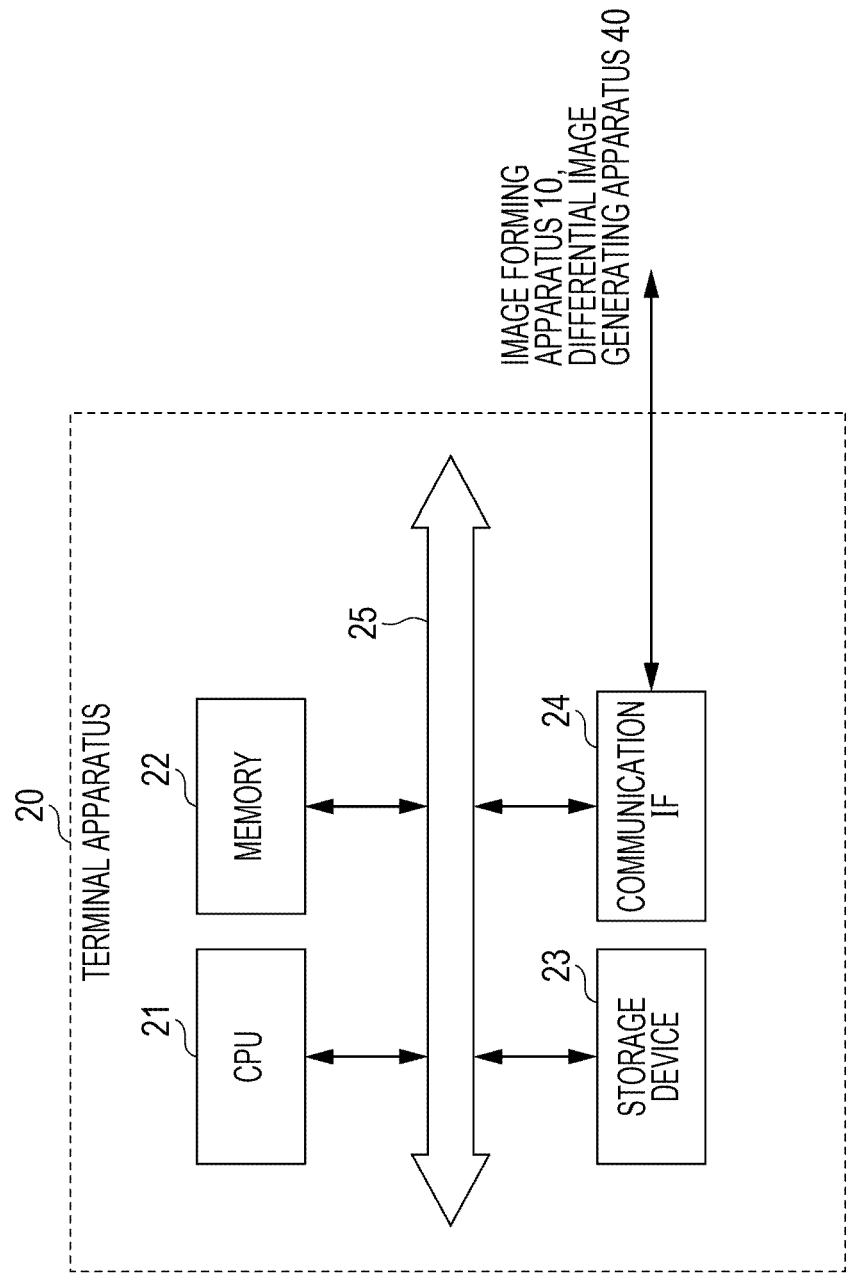
FIG. 2 is a block diagram illustrating the hardware configuration of a terminal apparatus according to the exemplary embodiment of the present invention.

Next, FIG. 2 illustrates the hardware configuration of the terminal apparatus 20 in the image forming system according to the exemplary embodiment.

Note that the description below is given using the case in which documents subjected to comparison are drawings. In the case where documents other than drawings, such as paper documents, are subjected to differential detection, the exemplary embodiment of the present invention is similarly applicable.

The terminal apparatus 20 includes, as illustrated in FIG. 2, a central processing unit (CPU) 21, a memory 22, a storage device 23 such as a hard disk drive (HDD), and a communication interface (IF) 24 that transmits and receives data to and from the image forming apparatus 10 and the differential image generating device 40. These elements are connected to one another via a control bus 25.

The CPU 21 executes a certain process based on a control program stored in the memory 22 or the storage device 23, and controls the operation of the terminal apparatus 20.

Although the embodiment discusses that the CPU 21 reads and executes a control program stored in the memory 22 or the storage device 23, the program may be stored in a storage medium such as a compact-disc read-only memory (CD-ROM) and may be provided to the CPU 21.

Figure 3:
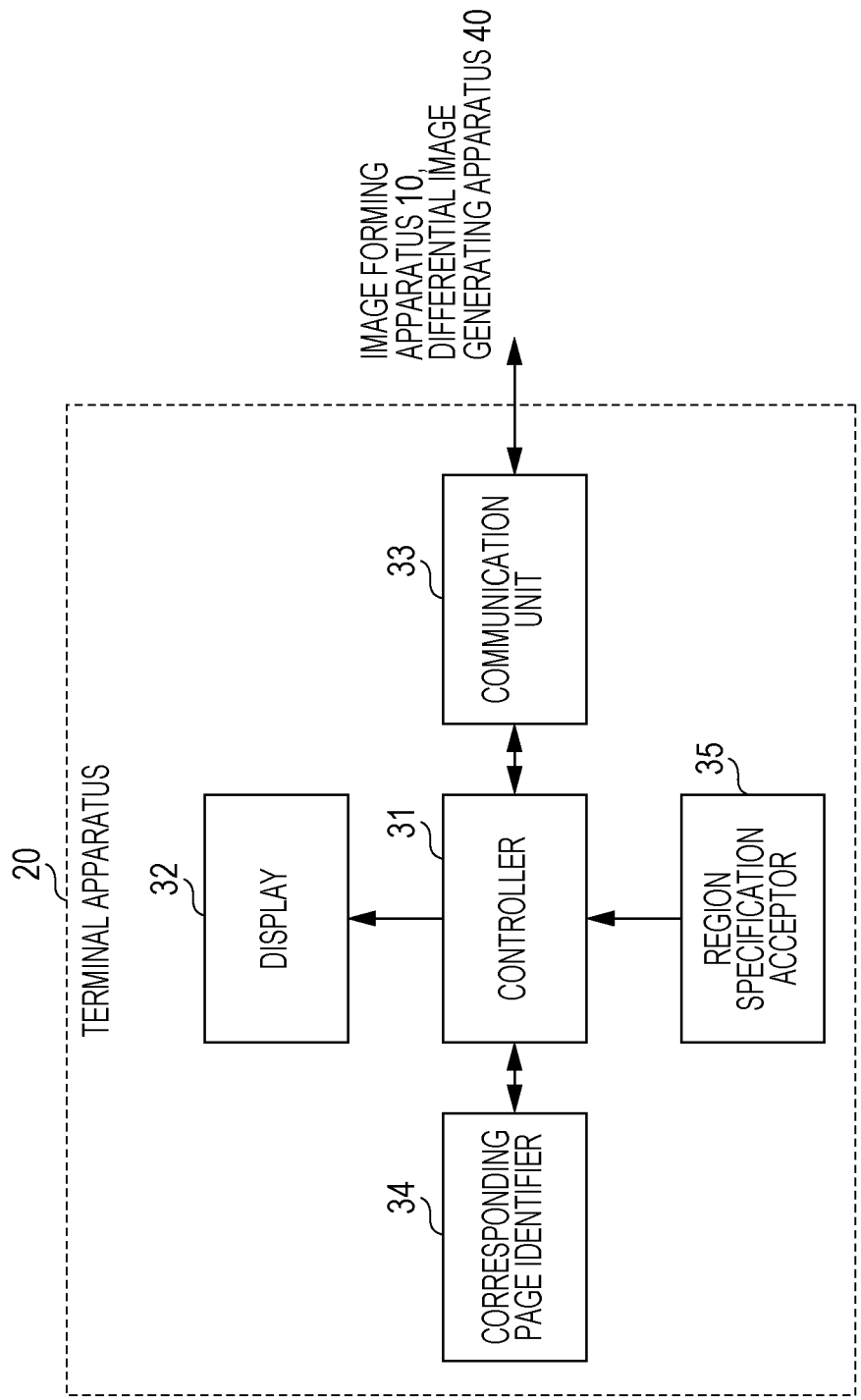
FIG. 3 is a block diagram illustrating the functional configuration of the terminal apparatus according to the exemplary embodiment of the present invention.

FIG. 3 is a block diagram illustrating the functional configuration of the terminal apparatus 20 realized by execution of the above-mentioned control program.

The terminal apparatus 20 of the exemplary embodiment includes, as illustrated in FIG. 3, a controller 31, a display 32, a communication unit 33, a corresponding page identifier 34, and a region specification acceptor 35.

In the case where one of two items of drawing data (first drawing data and second drawing data) subjected to differential detection has multiple pages (pages), the corresponding page identifier 34 identifies a pair of corresponding pages between the two items of drawing data subjected to differential detection.

In the case where drawings subjected to differential detection have multiple pages, there involves a preliminary process before performing differential detection, which is identifying in advance which paired pages are subjected to differential detection. Thus, the corresponding page identifier 34 identifies a pair of pages subjected to differential detection in a preliminary process before performing differential detection.

Specifically, the corresponding page identifier 34 calculates a correlation coefficient (second degree of similarity) between images of pages of two items of drawing data subjected to differential detection, and identifies, as a pair of corresponding pages, a pair of pages of drawing data whose calculated correlation coefficient is maximum and exceeds a preset threshold.

Note that images are not limited to simple images, and may be text or photographs. Further, a pair of pages of drawing data whose calculated correlation coefficient is maximum or exceeds a preset threshold may be identified as a pair of corresponding pages.

Having identified a pair of corresponding pages, the corresponding page identifier 34 calculates again a correlation coefficient of uncorresponding pages after excluding, from pages of two items of drawing data subjected to differential detection, a page identified as being corresponding to a page of the other drawing data, and sequentially identifies a pair of corresponding pages between the uncorresponding pages of the two items of drawing data subjected to differential detection.

At that time, the corresponding page identifier 34 calculates, on the basis of the number of pages of the two items of drawing data subjected to differential detection and the page order of the pages in the drawing data, a pair establishment probability that is a probability that pages of the two items of drawing data correspond to each other, and, calculates a correlation coefficient only for a top preset number of pairs of pages, such as top n pairs of pages, with the highest calculated pair establishment probability (first degree of similarity), thereby identifying pairs of corresponding pages.

The display 32 displays an image group including images such as thumbnail images (size-reduced images) corresponding to the pages of the two items of drawing data subjected to comparison.

The controller 31 displays drawing data page by page in accordance with the page order of the items of drawing data, connects the paired pages identified by the corresponding page identifier 34 with a straight line, and, in the case where pages of the drawing data are not identified by the corresponding page identifier 34, controls the display 32 to display information indicating that there are no corresponding pages of the drawing data. Specifically, the controller 31 causes the display 32 to display a page for which no corresponding page has been identified distinctively from paired pages, for example, in a color different from other pages, or in a different column.

The controller 31 may control the display 32 to display the top ends of pages of the drawing data, identified by the corresponding page identifier 34, in accordance with the page order, display pages of the first and second drawing data regardless of the page order in a horizontal direction, and connect the paired corresponding pages of the drawing data with a line.

Further, the controller 31 may control the display 32 to display, in the case where a certain pair of pages is selected on the display 32, detailed images of the pages of the selected pair.

The region specification acceptor 35 accepts specification of a region for partially performing differential detection on the detailed images displayed on the display 32.

The communication unit 33 transmits image data or the like to the image forming apparatus 10 or the differential image generating device 40, or receives image data scanned by the image forming apparatus 10, for example.

Next, the operation of generating differential image data in the image forming system of the exemplary embodiment will be described in detail with reference to the drawings.

Figure 4:
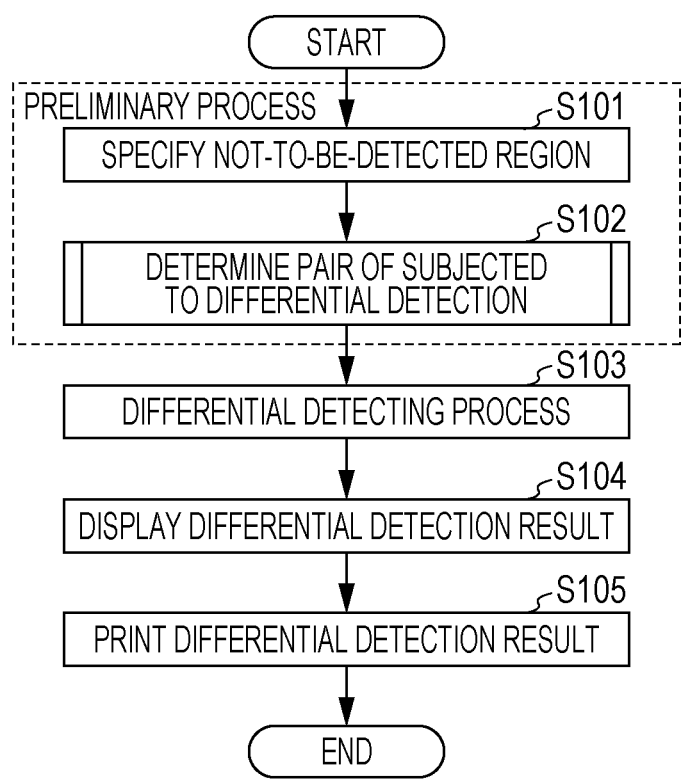
FIG. 4 is a flowchart for describing the overall operation of generating differential image data in the image forming system according to the exemplary embodiment of the present invention.

First, the overall operation of generating differential image data in the image forming system of the exemplary embodiment will be described with reference to the flowchart illustrated in FIG. 4. A process of identifying a pair subjected to differential detection in the flowchart illustrated in FIG. 4 will be described in detail with reference to the flowchart illustrated in FIG. 5.

In the image forming system of the exemplary embodiment, when a differential detection process is performed, the terminal apparatus 20 performs a preliminary process for performing differential detection. Two processes in the flowchart illustrated in FIG. 4, namely, specification of a not-to-be-detected region (step S101) and identification of a pair subjected to differential detection (step S102), correspond to this preliminary process.

Figure 6:
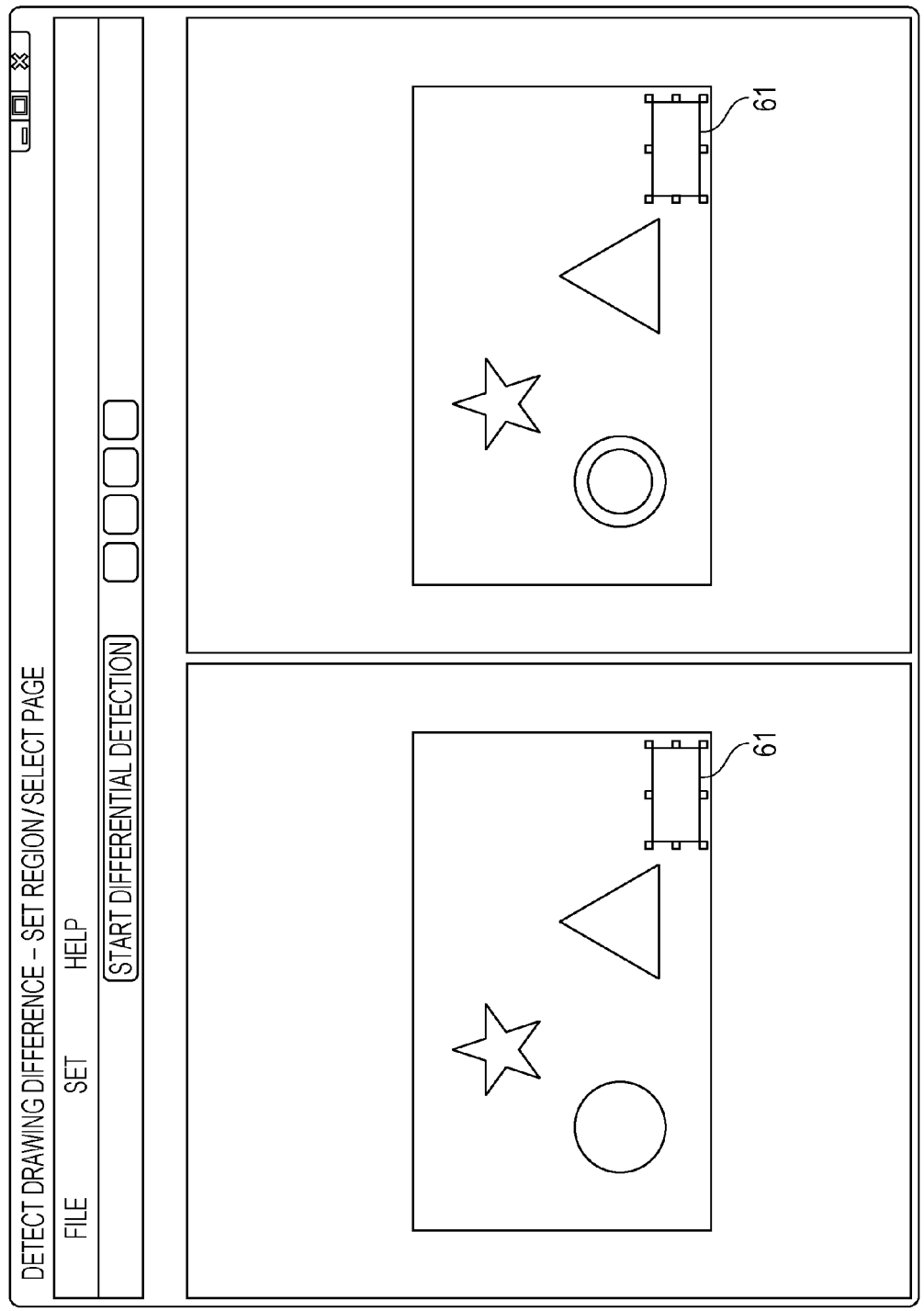
FIG. 6 is a diagram illustrating an exemplary screen on which a not-to-be-detected region where no differential detection is to be performed is specified.

First, the terminal apparatus 20 specifies, in two items of drawing data subjected to differential detection, a not-to-be-detected region (region not subjected to detection) as a region where no differential detection is to be performed (step S101). FIG. 6 illustrates an exemplary screen in the case where specification of a not-to-be-detected region is performed. In the exemplary screen illustrated in FIG. 6, the case in which a not-to-be-detected region 61 is specified in an old drawing and an new drawing is illustrated.

Next, the corresponding page identifier 34 of the terminal apparatus 20 identifies a pair subjected to differential detection, which is a pair of pages where differential detection is to be performed (step S102). Note that this process of identifying a pair subjected to differential detection will be described in more detail later.

The two items of drawing data subjected to differential detection, whose pages in which differential detection is to be performed are identified, are transmitted via the communication unit 33 to the differential image generating device 40, and a differential detection process is performed (step S103).

The result of the differential detection process performed in step S103 is transmitted as differential image data via the communication unit 33 to the terminal apparatus 20, and is displayed on the display 32 (step S104).

Finally, the differential image data is transmitted via the communication unit 33 to the image forming apparatus 10, and is printed as a differential image on a print sheet (step S105).

Figure 5:
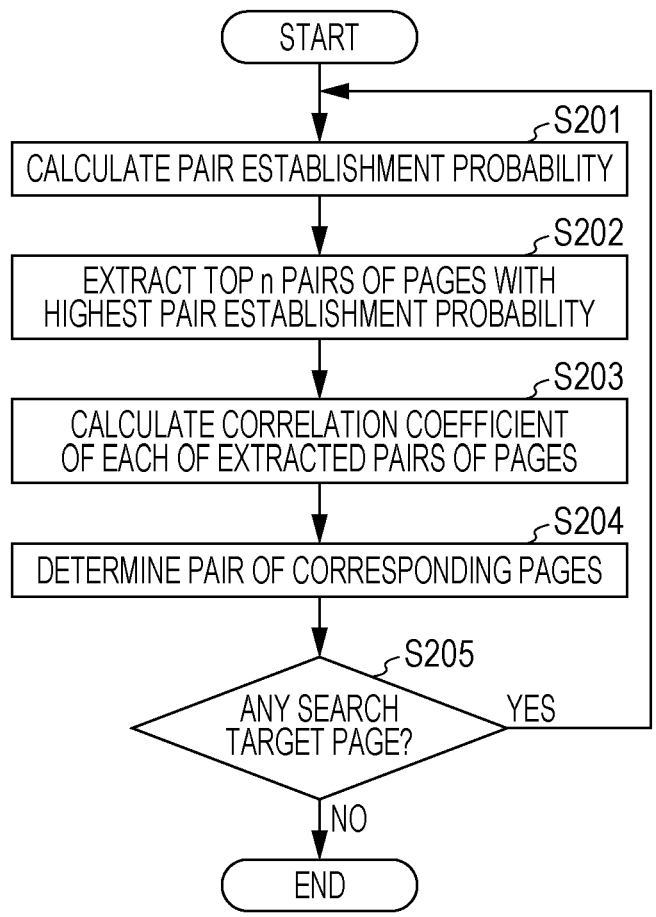
FIG. 5 is a flowchart for describing the details of a process of identifying a pair subjected to differential detection described in step S102 of the flowchart illustrated in FIG. 4.

Next, a process of identifying a pair subjected to differential detection, described in step S102 mentioned above, will be described in detail with reference to the flowchart illustrated in FIG. 5.

As has been described above, in the case where drawings subjected to differential detection have multiple pages, there involves a preliminary process before performing differential detection, which is identifying in advance which paired pages are subjected to differential detection. Thus, the corresponding page identifier 34 of the exemplary embodiment is configured to automatically identify a pair of pages where differential detection is to be performed, without involving the user to specify which paired pages are subjected to differential detection.

Figure 7:
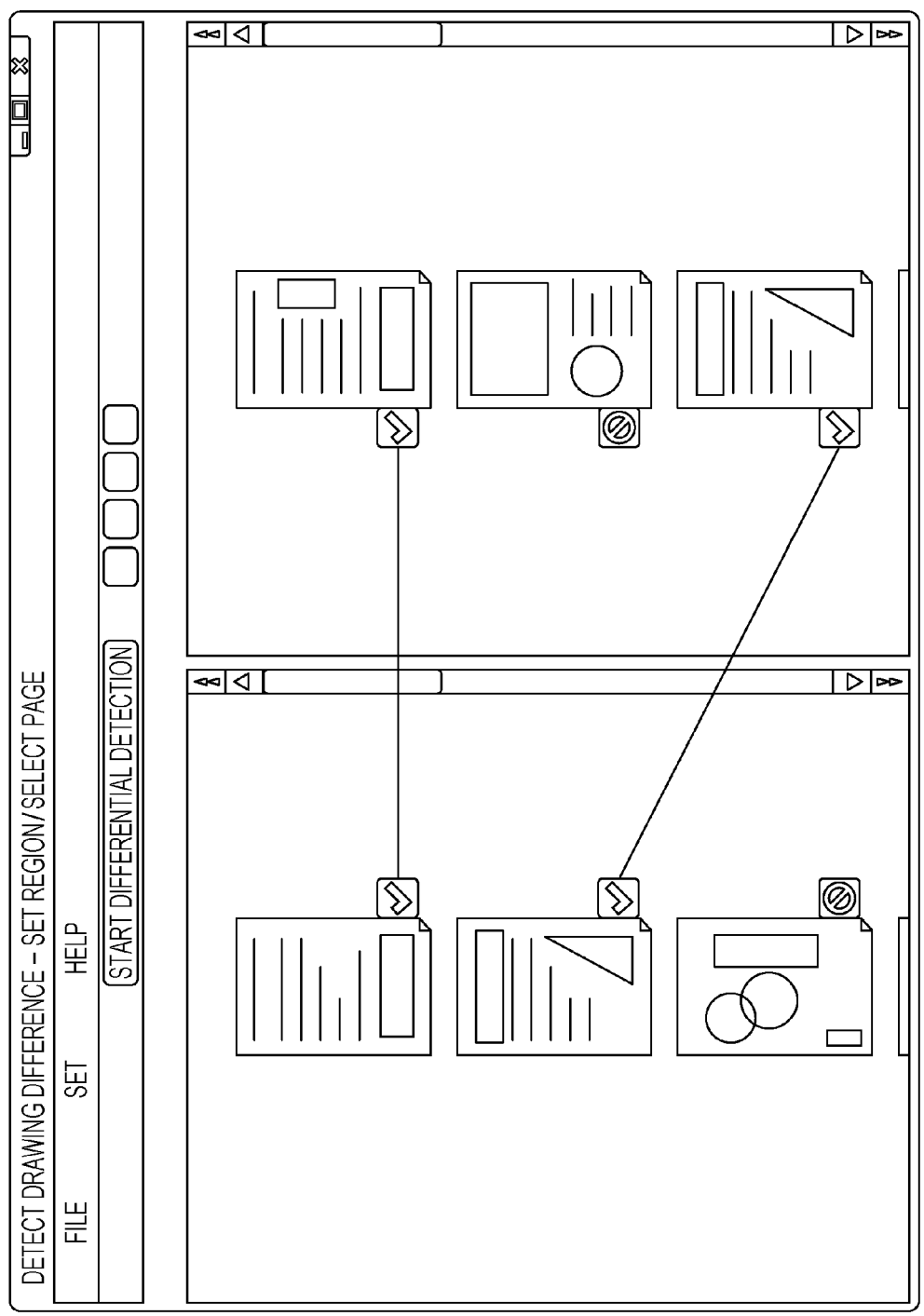
FIG. 7 is a diagram illustrating an exemplary display screen in the case where a user specifies, with a manual operation, which paired pages are subjected to differential detection.

Note that, in the terminal apparatus 20 of the exemplary embodiment, the user is also capable of directly specifying which paired pages are subjected to differential detection. FIG. 7 illustrates an exemplary display screen in the case where the user specifies, with a manual operation, which paired pages are subjected to differential detection.

In the exemplary display screen illustrated in FIG. 7, the user refers to thumbnail images and specifies corresponding pages between the pages of old drawings and the pages of new drawings. In doing so, it is illustrated that the paired corresponding pages are connected with a line.

Like this example, in order for the user to identify corresponding pages and to set a pair of pages subjected to differential detection, the user refers to thumbnail images and specifies which page corresponds to which page on a page-by-page basis.

Unlike that, the corresponding page identifier 34 of the terminal apparatus 20 of the exemplary embodiment automatically identifies which page corresponds to which page between old drawing data and new drawing data subjected to differential detection, and whether these corresponding pages will be subjected to differential detection, without involving the user's operation.

First, the corresponding page identifier 34 calculates, on the basis of the number of pages of the two items of drawing data subjected to differential detection and the positions of the pages in the drawing data, a pair establishment probability that is a probability that pages of the two items of drawing data correspond to each other (step S201).

Figure 8:
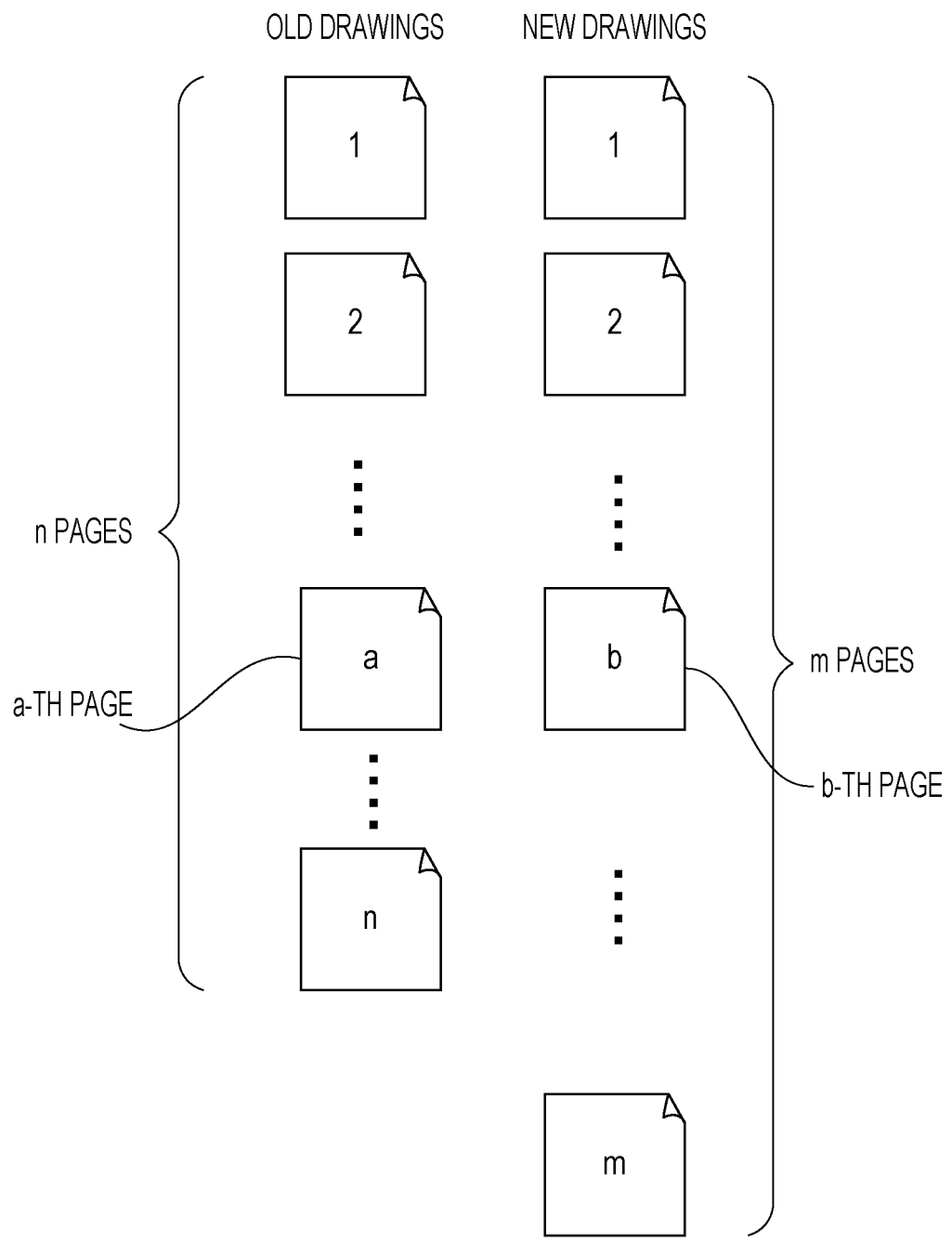
FIG. 8 is a diagram for describing a condition for calculating a pair establishment probability.

For example, as illustrated in FIG. 8, in the case where the old drawings have n pages and the new drawings have m pages, a probability that the a-th page of the old drawings and the b-th page of the new drawings become a first pair is calculated by equation (1) in FIG. 9.

Note that, in equation (1), it is assumed that a probability that each page is used is the same for all pages, that the number of used pages ranges from 0 to n, which is uniform distribution, and that the page order will not be changed. In the case where pairs of pages that will be pairs in a later-described process are established, similar calculation is performed for the remaining pages of the old drawings and the new drawings.

For example, in the case where the old drawings have 10 pages and the new drawings have 20 pages, the calculation results obtained in the case where pair establishment probabilities are calculated on the basis of the above-mentioned equation are as such illustrated in FIG. 10.

Next, the corresponding page identifier 34 extracts a top preset number of pairs (n pairs) of pages, such as top 10 pairs of pages, with the highest calculated pair establishment probability (step S202).

Although the exemplary embodiment discusses the case where the number of pairs of pages to be extracted is top 10 pairs with the highest pair establishment probability, the number of pairs to be extracted may be changed by the user. The greater the number of pairs extracted, the higher the accuracy of pairs to be identified, but the lower the processing speed. In contrast, the smaller the number of pairs extracted, the lower the accuracy of pairs to be identified, but the higher the processing speed. Therefore, the number of pairs to be extracted may be determined by having the user set the accuracy and the processing speed. Further, the number of pairs and the pair establishment probability may be displayed in a graph, and, based on that, the user may set the number of pairs to be extracted. Further, pairs whose pair establishment probability values are greater than or equal to a preset value may be extracted.

The corresponding page identifier 34 calculates a correlation coefficient (degree of similarity) for each of the extracted 10 (n) pairs of pages (step S203).

Specifically, the corresponding page identifier 34 sequentially compares each pixel of the two items of drawing data, which are binary image data, and accumulates the comparison result, thereby calculating a correlation coefficient. For example, a value that becomes 1.0 in the case where all pixels match and −1.0 in the case where all pixels are different is calculated as a correlation coefficient. That is, a correlation coefficient in this case is any value that ranges from −1.0 to 1.0.

The preliminary process before performing differential detection further includes alignment of the paired pages subjected to differential detection. To this end, in calculation of a correlation coefficient in the exemplary embodiment, a correlation coefficient at each position in the two items of drawing data is calculated, thereby identifying as well as aligning a pair having a corresponding relationship.

Figure 12A:
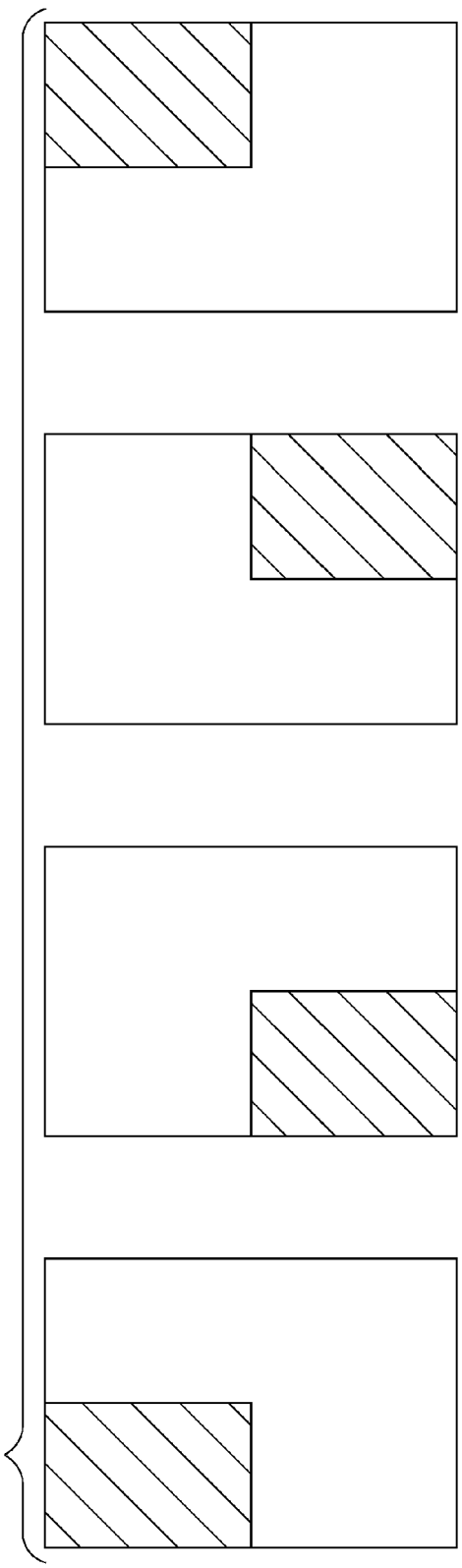
FIGS. 12A and 12B are diagrams for describing alignment performed in calculation of a correlation coefficient of two items of drawing data.

Specifically, in the case where differential detection is performed between drawing documents where images of the same size are printed on sheets of the same size, in the exemplary embodiment, the corresponding page identifier 34 aligns the pages at the upper left-hand corner, as illustrated in FIG. 12A, and calculates a correlation coefficient while rotating the pages by 0 degrees, 90 degrees, 180 degrees, and 270 degrees. Note that the alignment may be performed at the lower left-hand corner, upper right-hand corner, or lower right-hand corner, as illustrated in FIG. 12A, or at the center, as illustrated in FIG. 12B.

Figure 12B:
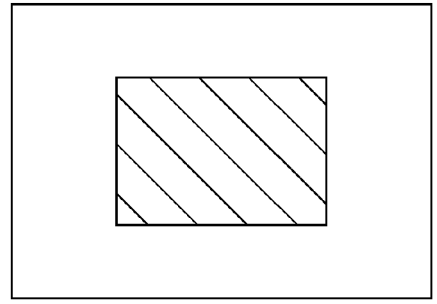

Further, in the case where differential detection is performed between drawing documents where images of the same size are printed on sheets of different sizes, such as A3 and A4 as illustrated in FIG. 11, in the exemplary embodiment, the corresponding page identifier 34 performs a total of five types of alignment, that is, alignment at the upper left-hand corner, lower-left hand corner, upper right-hand corner, and lower right-hand corner, as illustrated in FIG. 12A, and alignment at the center, as illustrated in FIG. 12B. At each position, a correlation coefficient is calculated while rotating the pages by 0 degrees, 90 degrees, 180 degrees, and 270 degrees.

That is, the corresponding page identifier 34 calculates a correlation coefficient for a pair subjected to five types of alignment (upper left-hand corner, lower-left hand corner, upper right-hand corner, lower right-hand corner, and center) and four types of rotation (0 degrees, 90 degrees, 180 degrees, and 270 degrees).

In addition, the corresponding page identifier 34 calculates a correlation coefficient of the two items of drawing data not only at a 1:1 scale, but also calculates a correlation coefficient while enlarging drawing data of a smaller size to larger drawing data or reducing the size of larger drawing data to smaller drawing data.

The corresponding page identifier 34 identifies a pair of pages of drawing data whose correlation coefficient calculated in step S203 is maximum and exceeds a preset threshold (such as 0.5) as a pair of corresponding pages (step S204). Here, in the case where correlation coefficients calculated for all pairs of pages do not exceed the preset threshold, the corresponding page identifier 34 determines that there is no pair of corresponding pages in the pairs of pages extracted in step S202.

Although the exemplary embodiment discusses the example in which the corresponding page identifier 34 performs extraction of a pair subjected to calculation of the degree of similarity, calculation of the degree of similarity of the extracted pair, identification of a corresponding pair based on the calculated degree of similarity, and alignment of the identified pair, these processes may be performed by different devices or units.

In response to identification of a pair of corresponding pages in step S204, the corresponding page identifier 34 excludes the page whose corresponding page has been identified, and all the pages preceding that page from being targets, and determines whether there still remains a page for which whether there is a corresponding page is determined (step S205). In the case where there still remains such a search target page, the corresponding page identifier 34 returns to step S201. In the case where there is no more search target page, the corresponding page identifier 34 ends the process of identifying a pair of pages.

Figure 13:
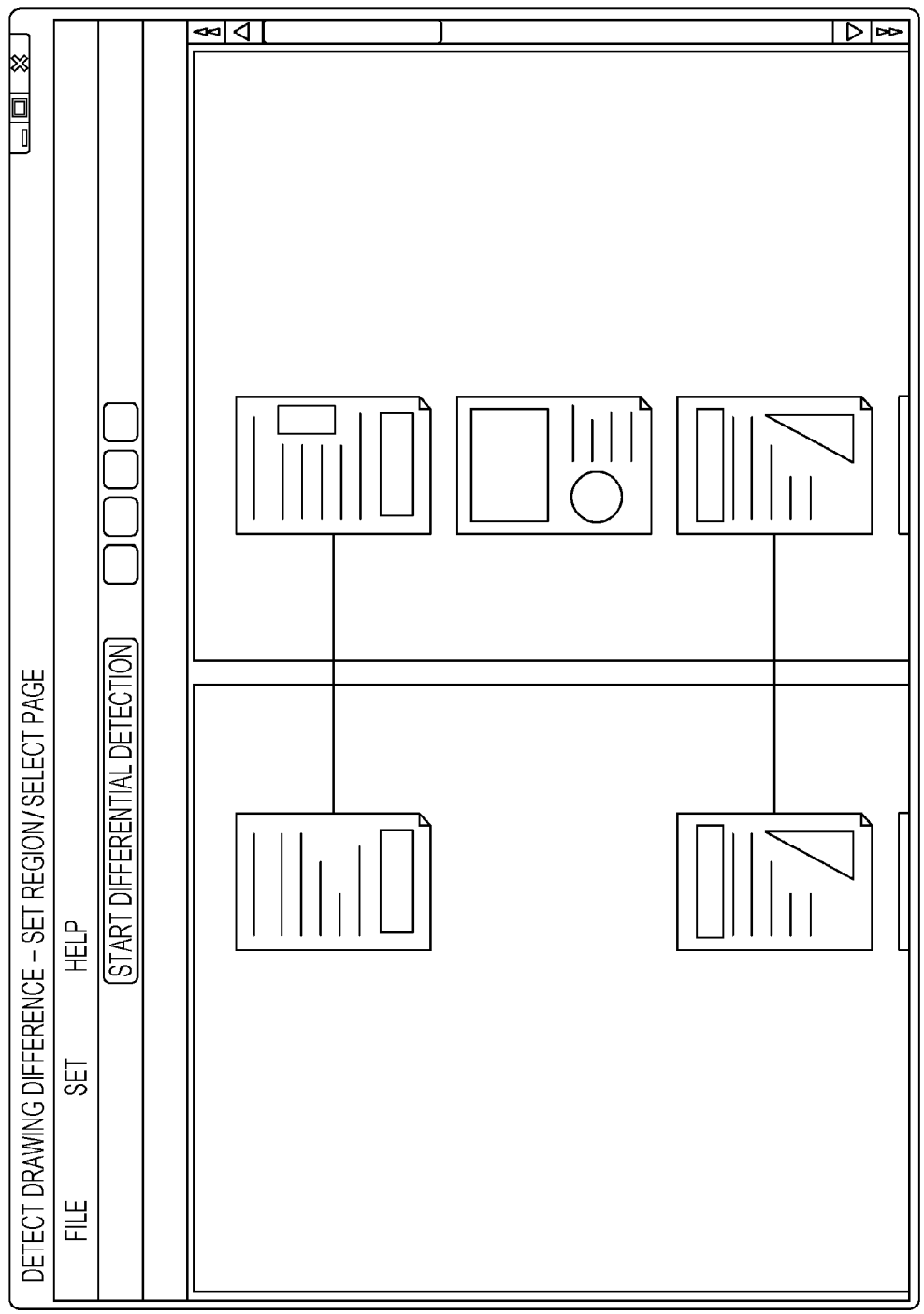
FIG. 13 is a diagram illustrating an example in the case where the result of identifying a pair of corresponding pages between pages of old drawing data and new drawing data is displayed on a display.

FIG. 13 is a diagram illustrating an example in the case where the result of identifying a pair of corresponding pages between pages of old drawing data and new drawing data is displayed on the display 32.

In the display example illustrated in FIG. 13, the old drawing data and the new drawing data are displayed page by page in accordance with the page order of the old drawing data and the new drawing data, and corresponding pages of the old drawing data and the new drawing data are connected with a line. Referring to FIG. 13, no line is connected to a page for which no corresponding page has been identified, and it is clear that there is no corresponding page.

Figure 14:
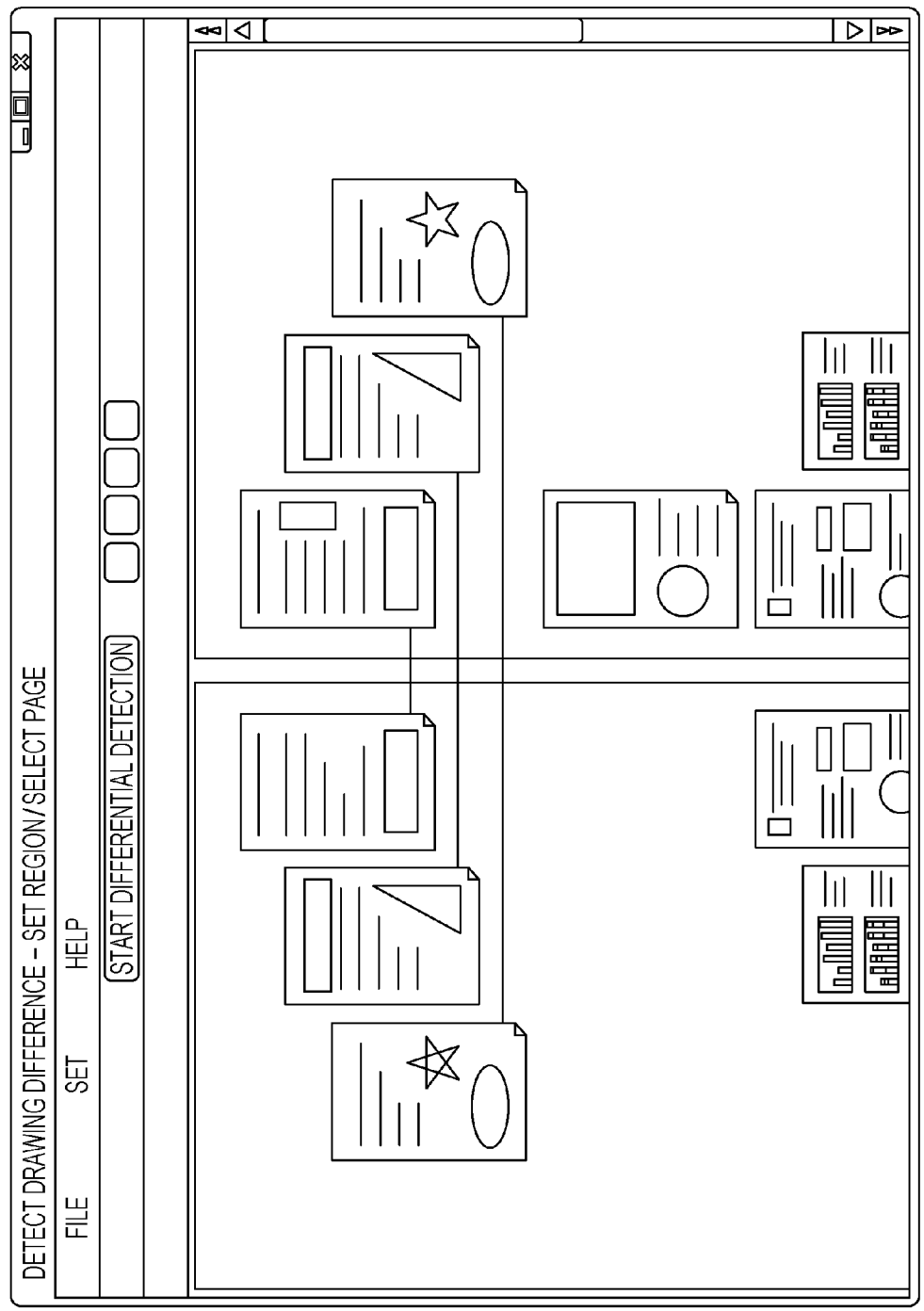
FIG. 14 is a diagram illustrating another example in the case where the result of identifying a pair of corresponding pages between pages of old drawing data and new drawing data is displayed on the display.

In the case of simultaneously displaying many pairs of pages while eliminating unnecessary space, as illustrated in FIG. 14, the following display method may be used. That is, the top ends of the pages of the old drawing data and the new drawing data are displayed in a vertical direction in accordance with the page order, the pages of the old drawing data and the new drawing data are displayed in a horizontal direction regardless of the page order, and corresponding pages of the old drawing data and the new drawing data are connected with a line.

Figure 15:
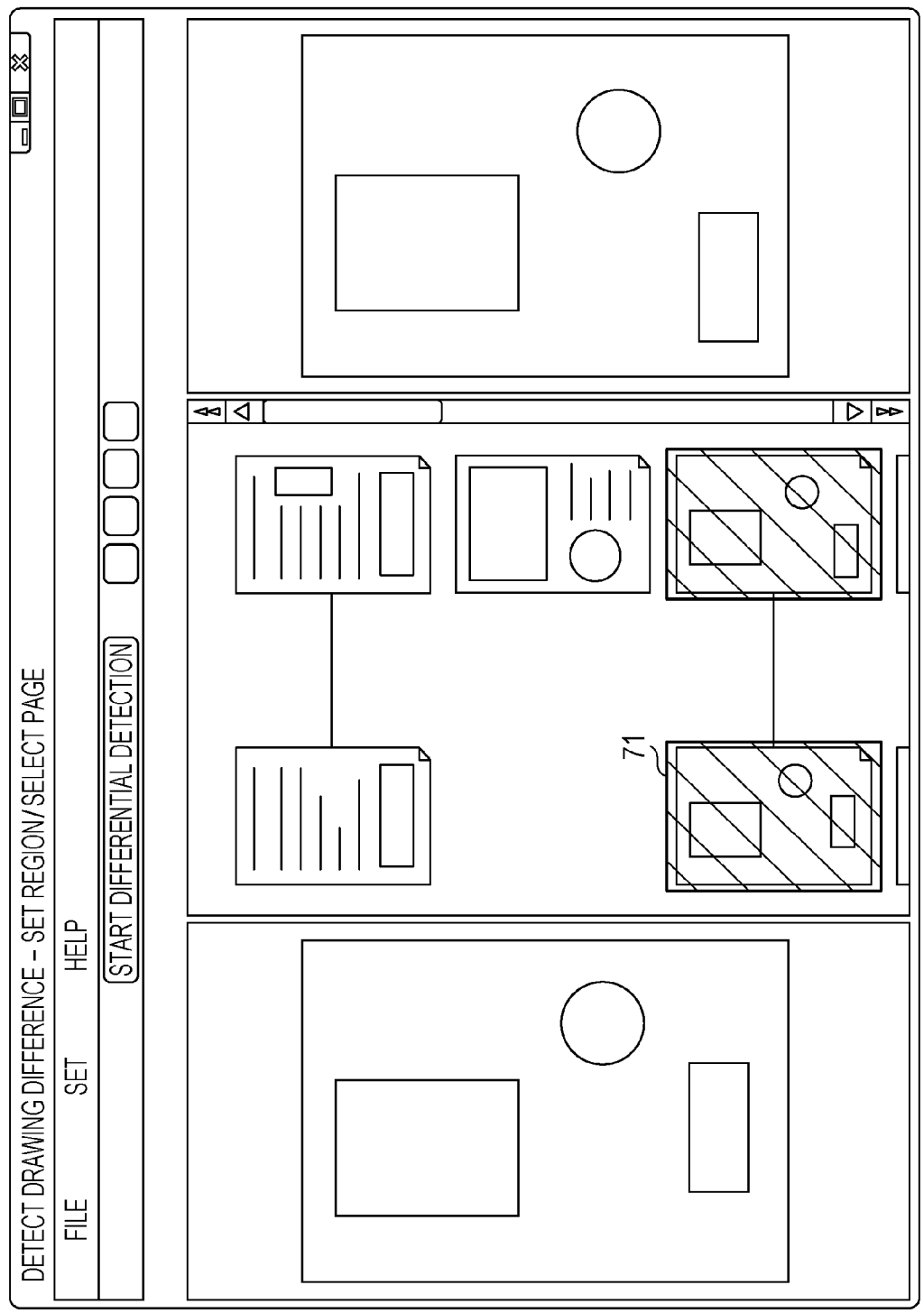
FIG. 15 is a diagram illustrating an exemplary display screen that displays a detailed image of a drawing selected by selecting a thumbnail image.

Further, FIG. 15 displays another display method that may be used. In combination with a screen for checking pairs of corresponding pages and a screen for checking the details of the contents of each page, when a thumbnail image is selected, a detailed image of the selected drawing is displayed. With the display method illustrated in FIG. 15, selecting a thumbnail image of one of the old and new drawings not only displays a detailed image of the selected drawing, but also displays a detailed image of a page that corresponds to the page of the selected thumbnail image on another screen. In doing so, display is switched on a pair by pair basis. For example, FIG. 15 illustrates the case in which, by selecting one thumbnail image 71 of the old drawing, detailed images of pages of both the old and new drawings are displayed.

Figure 16:
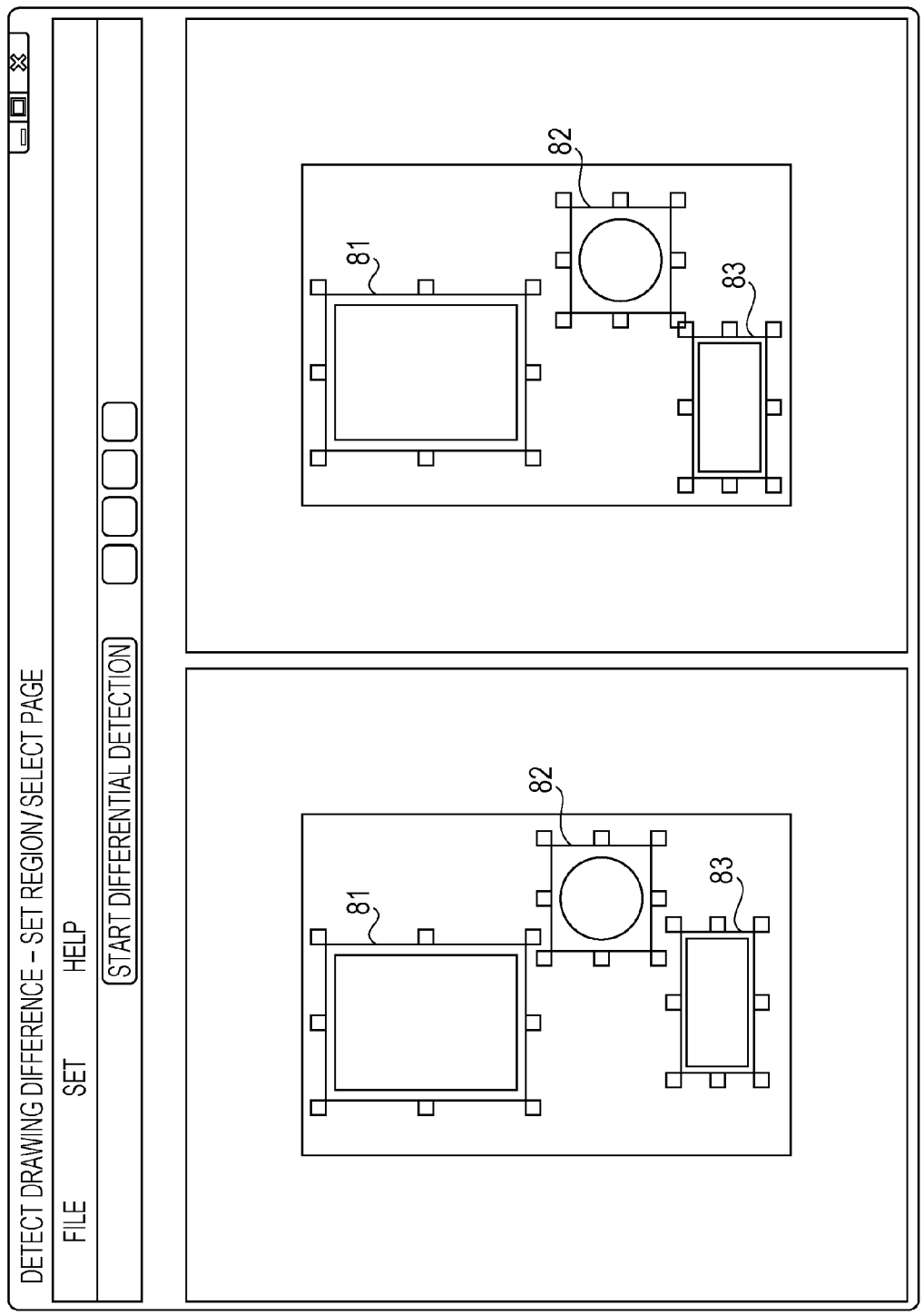
FIG. 16 is a diagram illustrating an exemplary display screen for describing how a user specifies a region where the user wants to perform differential detection within one page.

In the case where detailed images are displayed on a pair by pair basis, as illustrated in FIG. 15, the region specification acceptor 35 may accept specifications 81 to 83 of regions where the user wants to perform differential detection within one page, as illustrated in FIG. 16. Such region specification is effective in the case where the positions of objects where the user wants to perform differential detection within one screen are different. In the case where such region specification is performed, the differential image generating device 40 performs differential detection in each specified region.

Figure 17:
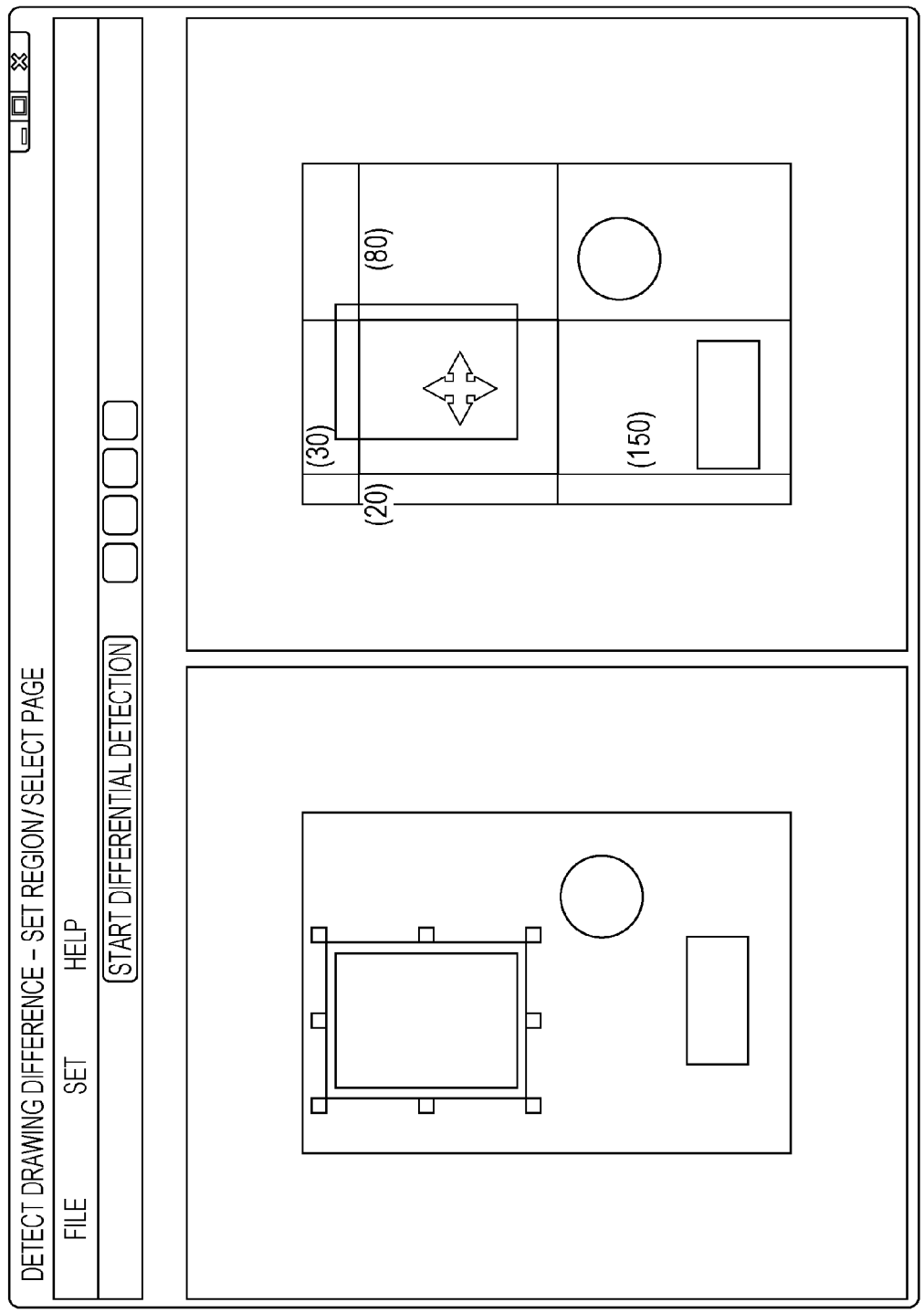
FIG. 17 is a diagram illustrating an exemplary display that displays, when a user specifies a region to be subjected to differential detection, distances from the four corners of the region to be specified.

In performing such region specification, as illustrated in FIG. 17, distances from the four corners of a specified region may be displayed as the region is moved.

Note that the page order may be changed by drag and drop on each page of the old and new drawings on the thumbnail image display screens illustrated in FIGS. 13 to 15. In changing the page order as such, paired pages of the drawings are moved in units of pairs.

In doing so, even in the case where the page order is changed mistakenly when multiple pages of drawings are read by a scanner, the page order may be changed by software running on the terminal apparatus 20 without directly editing the drawing data, and differential detection may be executed.

In addition, as illustrated in FIG. 18, pages where differential detection is to be performed and pages where no differential detection is to be performed are arranged in two columns, which makes it easier to distinguish one from the other. In such a display method, a page where no differential detection is to be performed may be moved by drag and drop to a page where differential detection is to be performed. In doing so, the moved page may be added to the column of pages where differential detection is to be performed.

Although the exemplary embodiment discusses the case in which a correlation coefficient is used in calculating the degree of similarity between two items of drawing data, the exemplary embodiment is not limited to this case, and the exemplary embodiment is similarly applicable to the case in which a feature amount of an image is calculated by using another calculation method, such as the sum of squared differences (SSD) or the Hough transform, and the calculated feature amount is used as the degree of similarity.

A program according to the exemplary embodiment of the present invention may be provided by being stored in a recording medium, or the program may be provided by a communication device or unit. In that case, for example, the above-mentioned program may be regarded as a "non-transitory computer readable recording medium having recorded thereon the program".

A "non-transitory computer readable recording medium having recorded thereon the program" refers to a computer readable recording medium having recorded thereon the program, which is used for installing, executing, and circulating the program.

The recording medium includes the following: digital versatile disc (DVD) including the specifications set by the DVD Forum, such as "DVD-R, DVD-RW, and DVD-RAM", and the specifications set by DVD+RW, such as "DVD+R and DVD+RW", compact disc (CD) including read-only memory (CD-ROM), CD-recordable (CD-R), and CD-rewritable (CD-RW), Blu-ray Disc (registered trademark), magneto-optical (MO) disc, flexible disk (FD), magnetic tape, hard disk, read-only memory (ROM), electrically erasable programmable read-only memory (EEPROM (registered trademark)), flash memory, random-access memory (RAM), and secure digital (SD) memory card.

The above-mentioned program or part thereof may be recorded in the above-mentioned recording medium and saved or circulated. In addition, the above-mentioned program or part thereof may be transmitted using communication, such as a wired network used in a local area network (LAN), a metropolitan area network (MAN), a wide area network (WAN), the Internet, an intranet, or an extranet, a wireless communication network, or a transmission medium using a combination thereof, or may be carried on a carrier wave.

Further, the above-mentioned program may be part of another program, or may be recorded along with another separate program in a recording medium. In addition, the above-mentioned program may be divided and stored in multiple recording media. In addition, the above-mentioned program may be recorded in any form, such as being compressed or encoded, as long as it is recoverable.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   an identifier that:
   (i) calculates, between a plurality of items of first document data and a plurality of items of second document data, a first degree of similarity of a pair of each page of the first document data and each page of the second document data, based on a page order of the first and second document data, the first degree of similarity being calculated separately for every page of the first document data with respect to every page of the second document data,
   (ii) extracts a pair of pages of which a second degree of similarity is calculated based on the first degree of similarity, and calculates the second degree of similarity of the extracted pair of pages based on images of the first and second document data, and
   (iii) identifies a page of the second document data that corresponds to a page of the first document data, based on the second degree of similarity.

2. The image processing apparatus according to claim 1, wherein
   the identifier calculates the second degree of similarity at each position in an image of each page of the first document data and an image of each page of the second document data, and aligns the pair based on the second degree of similarity.

3. The image processing apparatus according to claim 1, wherein
   the identifier calculates again the second degree of similarity between each uncorresponding page of the first document data after excluding a page of the first document data identified to be corresponding to a page of the second document data, and each uncorresponding page of the second document data after excluding a page of the second document data identified to be corresponding to a page of the first document data, and sequentially identifies a pair of corresponding pages between uncorresponding pages of the first document data and uncorresponding pages of the second document data.

4. The image processing apparatus according to claim 2, wherein
   the identifier calculates again the second degree of similarity between each uncorresponding page of the first document data after excluding a page of the first document data identified to be corresponding to a page of the second document data, and each uncorresponding page of the second document data after excluding a page of the second document data identified to be corresponding to a page of the first document data, and sequentially identifies a pair of corresponding pages between uncorresponding pages of the first document data and uncorresponding pages of the second document data.

5. The image processing apparatus according to claim 1, further comprising:
   a display controller that performs control to display the first and second document data page by page in accordance with the page order of the first and second document data, connect corresponding pages of the first and second document data with a line, and
   wherein the display controller displays information indicating that there is no page of the second document data that corresponds to a page of the first document data, in a case where the identifier does not identify a page of the second document data that corresponds to a page of the first document data.

6. The image processing apparatus according to claim 1, further comprising:
   a display controller that displays top ends of pages of the first and second document data in accordance with the page order in a vertical direction, displays pages of the first and second document data regardless of the page order in a horizontal direction, and connects corresponding pages of the first and second document data with a line.

7. The image processing apparatus according to claim 1, further comprising:
   a display controller that performs control to display, in a case where a pair of pages is selected on a display that displays an image group corresponding to pages of the first document data and an image group corresponding to pages of the second document data, detailed images of pages corresponding to the selected pair of pages.

8. The image processing apparatus according to claim 1, further comprising:
   a display controller that performs control to display, on an image group corresponding to pages of the first document data and an image group corresponding to pages of the second document data, a region where differential detection is to be partially performed.

9. An image processing method comprising:
   (i) calculating, between a plurality of items of first document data and a plurality of items of second document data, a first degree of similarity of a pair of each page of the first document data and each page of the second document data, based on a page order of the first and second document data, the first degree of similarity being calculated separately for every page of the first document data with respect to every page of the second document data;
   (ii) identifying a pair of pages of which a second degree of similarity is calculated based on the first degree of similarity, and calculating the second degree of similarity of the identified pair of pages; and
   (iii) identifying a page of the second document data that corresponds to a page of the first document data, based on the second degree of similarity.

10. A non-transitory computer readable medium storing a program causing a computer to execute a process, the process comprising:
    (i) calculating, between a plurality of items of first document data and a plurality of items of second document data, a first degree of similarity of a pair of each page of the first document data and each page of the second document data, based on a page order of the first and second document data, the first degree of similarity being calculated separately for every page of the first document data with respect to every page of the second document data;
    (ii) identifying a pair of pages of which a second degree of similarity is calculated based on the first degree of similarity, and calculating the second degree of similarity of the identified pair of pages; and
    (iii) identifying a page of the second document data that corresponds to a page of the first document data, based on the second degree of similarity.

* * * * *